(12) United States Patent
Zhuang et al.

(10) Patent No.: US 11,135,948 B2
(45) Date of Patent: Oct. 5, 2021

(54) LATCHING DEVICE FOR AUTOMOTIVE APPLICATIONS

(71) Applicant: Kiekert AG, Heiligenhaus (DE)

(72) Inventors: Jim Zhuang, Canton, MI (US); Keith Robertson, Livonia, MI (US)

(73) Assignee: Kiekert AG, Heiligenhaus (DE)

( * ) Notice: Subject to any disclaimer, the term of this patent is extended or adjusted under 35 U.S.C. 154(b) by 472 days.

(21) Appl. No.: 16/301,228

(22) PCT Filed: May 12, 2017

(86) PCT No.: PCT/IB2017/000559
§ 371 (c)(1),
(2) Date: Nov. 13, 2018

(87) PCT Pub. No.: WO2017/195021
PCT Pub. Date: Nov. 16, 2017

(65) Prior Publication Data
US 2019/0283633 A1      Sep. 19, 2019

Related U.S. Application Data

(60) Provisional application No. 62/336,136, filed on May 13, 2016.

(51) Int. Cl.
*B60N 2/36*      (2006.01)
*B60N 2/005*      (2006.01)
(Continued)

(52) U.S. Cl.
CPC ............. *B60N 2/366* (2013.01); *B60N 2/005* (2013.01); *B60N 2/0232* (2013.01); *E05B 81/14* (2013.01); *E05B 81/06* (2013.01)

(58) Field of Classification Search
CPC ...... B60N 2/366; B60N 2/005; B60N 2/0232; E05B 81/14; E05B 81/06
(Continued)

(56) References Cited

U.S. PATENT DOCUMENTS 4,118,056 A * 10/1978 Alexander ............. E05B 59/00
  292/169
2013/0285430 A1 * 10/2013 Ohba .................... B60N 2/2352
  297/367 P (Continued)

FOREIGN PATENT DOCUMENTS

DE    102008028255         12/2009
DE    102013103245 A1      10/2014
WO    2009/149685          12/2009

OTHER PUBLICATIONS

International Search Report and Written Opinion for corresponding Patent Application No. PCT/IB2017/000559 dated Aug. 10, 2017.

*Primary Examiner* — Mark R Wendell
(74) *Attorney, Agent, or Firm* — Renner, Otto, Boisselle & Sklar, LLP

(57) ABSTRACT

A latching device for automotive applications, in particular a backrest latch for the bolting and unbolting of seat backrests in motor vehicles. The latching device in its basic construction is equipped with a locking mechanism consisting predominantly of a catch and predominantly a pawl. Furthermore, an element which can be mechanically impinged by a drive unit, in particular an unbolting element is provided for the locking mechanism. In accordance with the invention, the drive unit for the element and in particular the unbolting element is equipped with at least an end stop demonstrating a cantilever arm.

16 Claims, 2 Drawing Sheets

Figure 1:
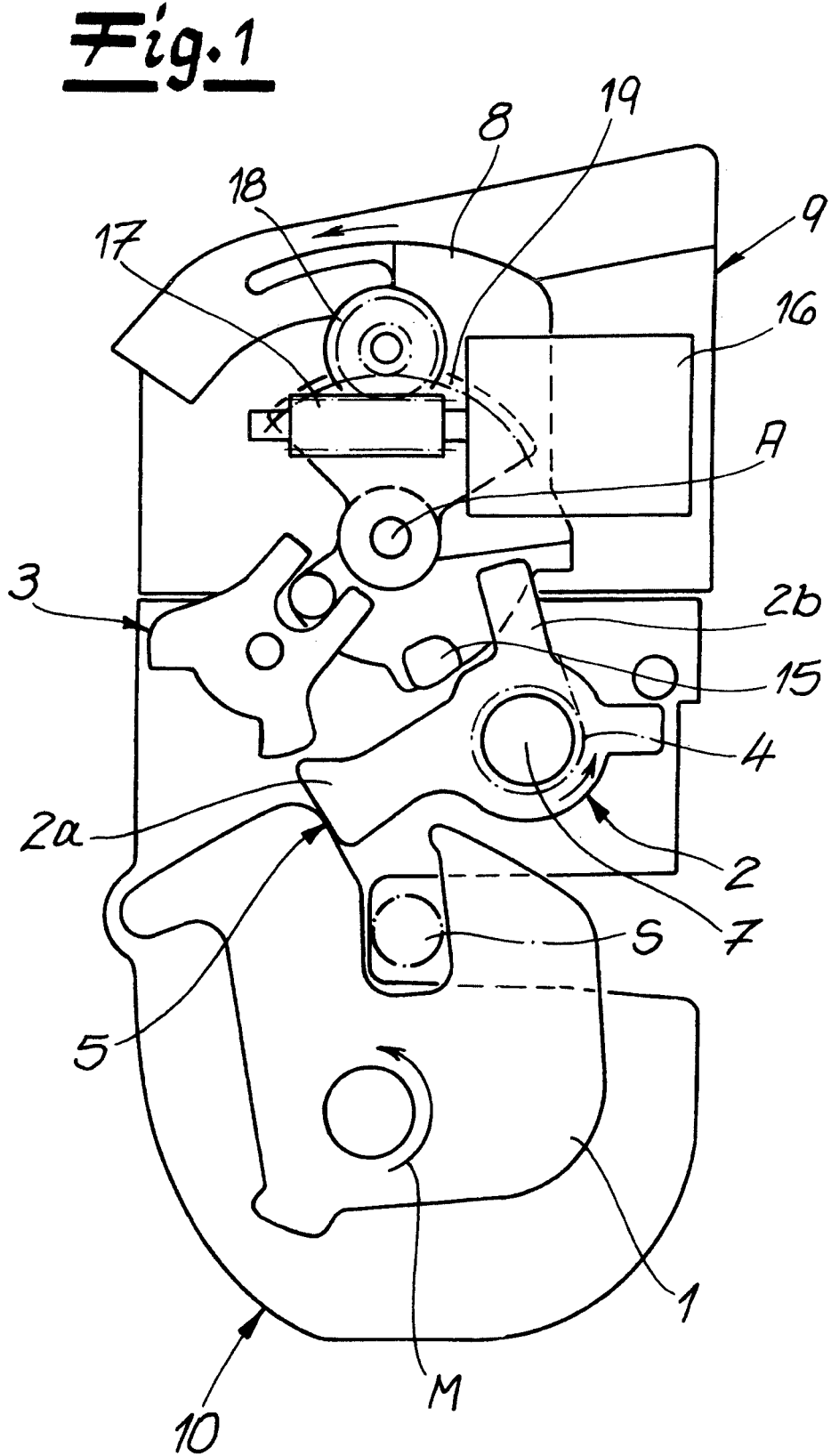

(51) Int. Cl.
  *E05B 81/14* (2014.01)
  *B60N 2/02* (2006.01)
  *E05B 81/06* (2014.01)
(58) Field of Classification Search
  USPC ........................................................ 292/221
  See application file for complete search history.

(56) References Cited

U.S. PATENT DOCUMENTS

| | | | |
|---|---|---|---|
| 2016/0214506 A1* | 7/2016 | Mueller | B60N 2/01583 |
| 2019/0143868 A1* | 5/2019 | Dey | E05B 81/06 |
| | | | 297/378.12 |
| 2019/0283633 A1* | 9/2019 | Zhuang | B60N 2/0232 |
| 2019/0360242 A1* | 11/2019 | Robertson | E05B 81/36 |
| 2020/0130541 A1* | 4/2020 | Kondo | B60N 2/206 |
| 2020/0223330 A1* | 7/2020 | Zhuang | B60N 2/2245 |
| 2021/0061145 A1* | 3/2021 | Godard | E05B 81/06 |

\* cited by examiner

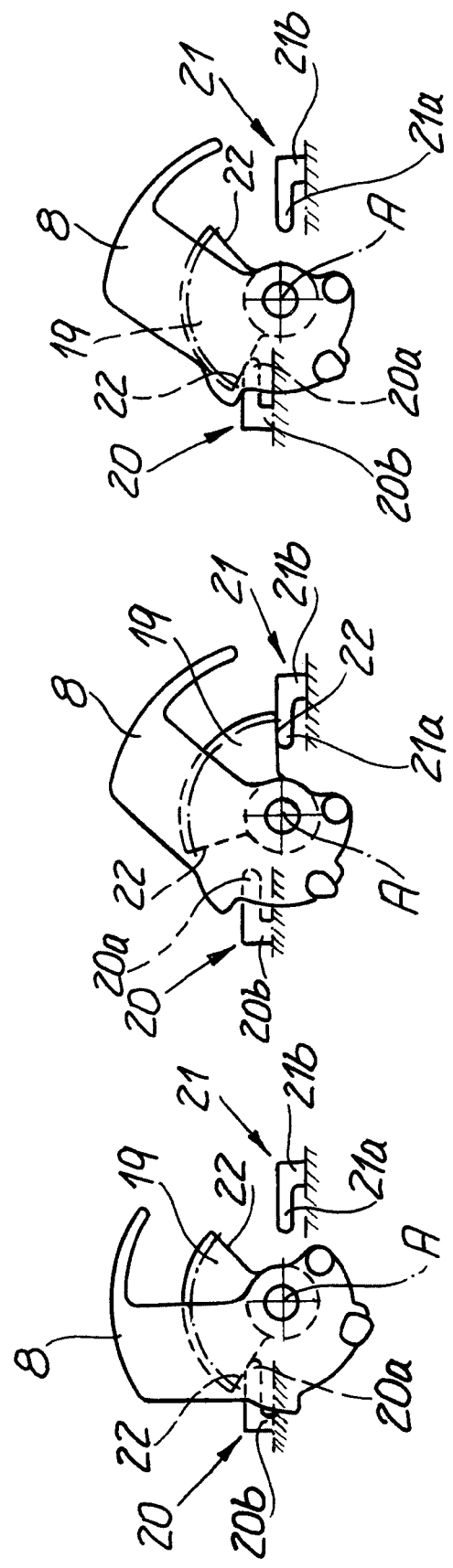

LATCHING DEVICE FOR AUTOMOTIVE APPLICATIONS

The invention relates to a latching device for automotive applications, in particular a backrest latch for the bolting and unbolting of seat backrests in motor vehicles, with a locking mechanism fundamentally comprising a catch and at least a pawl, and with an element which can be mechanically impinged by a drive unit, in particular an unbolting element for the locking mechanism.

The drive unit consequently works on an element which can be impinged with its help. Thus, the relevant element can be mechanically activated. The relevant element is in particular an unbolting element for the locking mechanism. However, in principle other elements can be mechanically impinged with the aid of the drive unit within the scope of the latching device.

In the class-specific state of the art in accordance with DE 10 2008 028 255 A1 a latching device is provided for which is equipped with an actuator or a drive unit. Furthermore, the latching device possesses a pivotable first pawl and a second pawl, with which the pivoting of the first pawl can be blocked. The actuator or the drive unit pivots the second pawl in such a direction that it consecutively releases and actively pivots the first pawl.

Furthermore, a comparable latching device is known via WO 2009/149685 A1. In this case too it involves a latching device with two pawls. The latching device possesses a mechanically driven actuator or a drive unit, which at least moves a triggering lever as an impingeable element or an unbolting element in such a manner that the triggering lever interacts during its movement with the two aforementioned pawls consecutively. This has proven itself in principle. With latching devices for automotive applications and in particular backrest latches for the bolting and unbolting of seat backrests in motor vehicles, it depends on the one hand that the relevant backrest latch can be easily unbolted for example with regard to the vehicle interior. Because the backrest latch usually belongs to a foldable seat backrest which must, for example, be folded over to increase the cargo volume within the motor vehicle. In contrast, the transportation of persons within the motor vehicle requires an upright position of the relevant seat backrest. On the other hand, in addition to impeccable remote control of the relevant seat backrest, a reliably functioning design together with a compact construction is desired.

Because the backrest latch is typically affixed in or on the foldable seat backrest. Here only a small installation space is naturally available within the necessary upholstery. Attempts are therefore made to give the drive unit as compact a design as possible. This applies equally where the seat backrest is mounted onto the chassis.

Compact drive units are often characterized by a multitude of interlocking components in order to transfer the rotational movement of an obligatory electromotor as a component of the drive unit onto the element impinged by it and in particular the unbolting element. The more deflections and components are involved in the power train, the greater the risk that indifferent functional states can occur. For example, if interlocking cogs, wormgears and wormgear wheels etc. demonstrate little play to one another or are no longer exactly aligned to one another. This applies in particular if the relevant drive unit or the element mechanically impinged by it is propelled against a stop or an end stop. In fact, the problem here is that with the aid of the stop the drive unit is abruptly decelerated. Consequently, inevitable elasticities lead or can lead to the aforementioned functional disturbances. This is where the invention wishes to provide assistance.

The invention is based on the technical problem of further developing such a latching device for automotive applications and in particular a backrest latch for the bolting and unbolting of seat backrests in motor vehicles in such a way that the functional safety is considerably increased compared to the state of the art and in particular misalignments of the interlocking cogs are prevented.

In order to solve this technical problem with a class-specific latching device for automotive applications the invention proposes that the drive unit is equipped with at least one end stop demonstrating a cantilever arm for the impingeable element, in particular for the unbolting element.

The cantilever arm is generally connected to a base. Furthermore, it has been proven if the base and the cantilever arm define a single-component cantilever end stop. This cantilever end stop is generally made of plastic. However, alternatively it is also possible for the cantilever end stop to be made of metal. The invention even encompasses hybrid forms.

Furthermore, it has proven especially beneficial in this context if the cantilever arm is fundamentally impinged vertically to its longitudinal extension. In fact, the end stop in question in this context can be impinged both by the drive unit and the element impingeable with the aid of the drive unit and also by both aforementioned components respectively and used as an end stop.

In all of these cases it is respectively crucial that the drive unit or the element or unbolting element impingeable by the drive unit is not abruptly decelerated on attainment of the stop or the end stop. Because attainment of the end stop corresponds to the cantilever arm being elastically deformed comparable to a unilaterally clamped supporting beam as a machine element.

On the other hand, the described elastic deformation of the end stop results in any tensions or cantings practically not/no longer occurring within a drivetrain starting from the electromotor as a component of the drive unit to the element or unbolting element impingeable by the drive unit. Thus, functional defects can be minimized. At the same time, recourse to such a "wandering stop" so to speak enables an especially compact design of the drive unit. Because this can be implemented and achieved in such a way that the drive train is deflected multiply and the relevant deflections due to the wandering stop does not lead to problems with regard to the functional safety of the drive unit. These are the crucial advantages.

The drive unit is generally equipped with two end stops. Both end stops are respectively made of plastic as single-component cantilever end stops. One of the end stops generally corresponds to the "bolted" position of the latching device or the locking mechanism and the other end stop corresponds to the "unbolted" position of the latching device or the locking mechanism. The drive unit and also the impingeable element or unbolting element is now typically moved backwards and forwards only between these two end positions "unbolted" and "bolted". Usually, it is even proceeded in such a way that the drive unit transfers the unbolting element from the "bolted" position to the "unbolted" position. Subsequently, the drive unit returns to the position belonging to the "bolted" position. To this end, the unbolting element is generally equipped with a free wheel for the drive unit or explicitly permits such resetting movements of the drive unit. There is thus the possibility of the element or unbolting element not only impinging mechanically with the aid of the drive unit, but independently of this a manual impingement of the unbolting element can be undertaken.

The drive unit generally comprises at least one electromotor, a gear shaft and a pinion element. The electromotor is equipped with a pinion shaft. The pinion shaft demonstrates a wormgear which combs with the gear shaft. Furthermore, the gear shaft engages in the pinion element. Thus, the gear shaft is advantageously a double gear shaft.

In fact, the gear shaft ensures on the one hand transmission of rotations of the pinion shaft of the electromotor at one end on the gear shaft, while the other end of the gear shaft implements the rotational movement of the gear shaft onto the pinion element. This can occur with different translations in each instance.

Generally, the usually circular-shaped pinion element has a cog provided for on the arch-shaped edge into which a relevant end cog of the gear shaft engages in order to cause the pinion element to rotate.

It has further been proven when the pinion element and the unbolting element impingeable by the drive unit are located on the same axis. Thus, an especially compact construction is already attained. Furthermore, a penetrated execution form is characterized in that the axis of the gear shaft and the axis of the pinion element and the unbolting element located on the same axis are arranged predominantly parallel to one another. The axis of the gear shaft is usually at a distance above the axis for the pinion element.

Thus, construction space is available below the gear shaft which the pinion shaft of the electromotor fills out with the pinion wormgear located on the pinion shaft. Thus, the pinion wormgear located on the pinion shaft of the electromotor engages from below into the gear shaft or is in engagement with it. As a consequence hereof, the electromotor stretches in its longitudinal extension crucially parallel to the level spanned by the pinion element.

Thus, an especially penetrated and compact design of the drive unit is provided which only requires an extremely small construction space. This is especially advantageous in consideration of the fact that the relevant latching device is advantageously a backrest latch. Such a backrest latch is typically installed into a foldable seat backrest for example of a back seat or a back seat bench. Alternatively, construction space in the chassis is required in this area.

As the seat backrest or rear seat backrest additionally demonstrates upholstery, an attempt is made to design the relevant backrest latch as small and flat as possible in order not to fear any impairment of convenience for an operator in the area of the backrest latch. Furthermore, the upholstery in the area of the relevantly equipped seat backrest or back seat backrest can still be of a narrow design. Consequently, the relevant seat backrest can be laid flat on a supporting surface or seat surface and thus maximum transportation volume is provided.

In order that now despite this compact design and the described multiple deflection of the power train starting from the electromotor to the pinion element and finally the unbolting element functional defects are avoided, at least one or both of the end stops demonstrating a cantilever arm are executed in accordance with the invention. Thus, the design is respectively such that the pinion element of the drive unit interacts with the cantilever arm. In fact, the pinion element is generally designed in a circular shape as already explained. Thus, the pinion element usually has at least one edge which grounds on the cantilever arm on reaching the end stop and hereby exerts the aforementioned force fundamentally running vertically to the lengthwise extension of the arm on it.

As the pinion element accomplishes a pivoting or circular movement initiated with the aid of the electromotor around its joint axis with the unbolting element and also the edge generally runs radially compared to this axis, the described and advantageous force effect is automatically explained. Because the radial course of the pinion element in conjunction with its pivoting movement around the joint axis with the unbolting element automatically leads to the edge grounding on the cantilever arm of the end stop and coming into contact here. As soon as this is the case, the cantilever arm and the edge are generally orientated parallel to one another. Because the cantilever arm of the end stop runs in an advantageous design mainly radially compared to the joint axis of the pinion element and the unbolting element.

As a consequence hereof, the circular-shaped pinion element and also the entire drive unit is gently decelerated because the grounding of the edge of the pinion element on the cantilever arm of the end stop leads to an elastic deformation of the cantilever arm with regard to its base. In fact, the cantilever arm behaves like a unilaterally clamped supporting beam with a force vertically exerted on the end side.

As a consequence of this elastic deformation of the cantilever arm not only is the drive unit gently decelerated, but it is also ensured that between the pinion wormgear of the pinion shaft and the gear shaft on the one hand and in the transition from the gear shaft to the cogging on the pinion element on the other hand no cantings are observed due to lagging or any elasticities in the drive train of the drive unit. The functional safety is thus enormously increased, with simultaneous consideration of an especially compact construction of the drive unit.

The cantilever arm of the end stop can be set variably with regard to its elasticity in certain boundaries. For example, this can occur via the material used or the substance for the single-component cantilever end stop which is usually executed here. This means that dependent on the plastic used for the relevant single-component cantilever end stop, the extent to which the cantilever arm ensures deformation during running aground of the edge of the pinion element can be determined and specified. At the same time, the choice of substance ensures that no canting is observed within the drive train. Here usually thermoplastic plastics such as polyethyls or polypropyls and POM (Polyoxymethylene) have proven especially beneficial.

The pinion wormgear of the pinion shaft of the electromotor can be made of a relevant plastic in the same way as the gear shaft. The same applies to the pinion element or the circular-shaped pinion disc in this context. Thus, not only an especially compact construction of the drive unit is provided, but the drive unit is also lightweight which is especially advantageous as enormous efforts are made nowadays to reduce vehicle weight. These are the crucial advantages.

Hereinafter, the invention is explained in further detail on the basis of a sketch which only depicts an execution example. It shows:

FIG. 1 an overview of the latching device in accordance with the invention and

FIG. 2 the object in accordance with FIG. 1 in the region of its two end stops in different functional settings.

A latching device is shown for automotive applications in the figures. In fact, it is primarily a backrest latch for the bolting and unbolting of seat backrests in motor vehicles. In FIG. 1 which represents the latching position an S locking clip is recognized from the relevant seat backrest merely indicated, which is connected or can be connected to the relevant seat backrest. The backrest latch depicted in the figures is provided for on the chassis side in contrast. This means it is connected to a motor vehicle chassis. In principle, the procedure can also take place vice versa. In this case, the backrest latch in accordance with FIG. 1 is located on the relevant seat backrest, whereas the locking clip S is connected to the chassis. However, that is not depicted.

With the aid of the backrest latch shown, a seat backrest can be bolted and unbolted in the motor vehicle. In the bolted state, the seat backrest typically assumes an upright position. In actual fact, the seat backrest is usually a rear seat backrest. In contrast, the unbolted position of the backrest or seat backrest generally corresponds to the seat backrest being folded back onto a seat surface. Thus, for example a loading space inside a motor vehicle can be increased.

On the basis of the figures it is recognized that the latching device in accordance with the invention is equipped with a locking mechanism 1, 2, 3. The locking mechanism 1, 2, 3 fundamentally comprises a catch 1 and two pawls 2, 3. In fact, a latching pawl 2 and also a securing pawl 3 are executed. A spring element 4 is also provided for which provides a force on the catch 1 which assists latching in the latching process of the locking mechanism 1, 2, 3.

The spring element 4 is assigned to the latching pawl 2. In addition, the spring element 4 impinges the latching pawl 2 in such a way that the latching pawl 2 glides along a contact surface 5 of the catch 1 during the latching process of the locking mechanism 1, 2, 3 and hereby generates a latching moment M. During a latching movement of the catch 1 the latching pawl 2 accomplishes an anti-clockwise movement around its rotational axis 7. The anti-clockwise movement of the latching pawl 2 is caused by the spring or the spring element 4, which ensures pre-tensioning of the latching pawl 2 in an anti-clockwise direction.

In this process, an activation arm 2a of the latching pawl 2 initially glides along the catch 1 with its lower edge on the contact surface 5. With increasing pivoting of the latching pawl 2 in an anti-clockwise direction around its rotational axis 7 in addition to the edge on the activation arm 2a in question a lower surface also comes into contact with the relevant contact surface 5 of the catch 1.

In addition, an element or unbolting element 8 is provided for which gives rise to an opening of the locking mechanism 1, 2, 3 or a locking mechanism opening. To this end, the unbolting element 8 can be mechanically and/or manually impinged. A drive unit 16, 17, 18, 19 ensures the mechanical impingement of the unbolting element 8.

The unbolting element 8 is a component of a fundamentally exchangeable unbolting module 9 together with the drive unit 16, 17, 18, 19. In fact, a latch housing 9, 10 of the depicted and described backrest latch comprises on the one hand the already stated unbolting module 9 and on the other hand a base module 10. The base module 10 incorporates the locking mechanism 1, 2, 3 and accommodates it.

In order to now open the locking mechanism starting from the latching position depicted in FIG. 1, the securing pawl 3 is initially transferred into a position releasing the latching pawl 2. The invention attains this by the unbolting element 8 being pivoted with the aid of the drive unit 16, 17, 18, 19 in relation to an axis or rotational axis A of the unbolting element 8 in an anti-clockwise direction as depicted. This means that the drive unit 16, 17, 18, 19 impinges the unbolting element 8 for unbolting starting from the bolted position in accordance with FIG. 1 in such a way that the unbolting element 8 is pivoted around the relevant axis A in an anti-clockwise direction. These individual functional steps are depicted in FIG. 2 from left to right. Here in the left part of FIG. 2 the "unbolted" position of the unbolting element 8 is recognized, whereas the right figure in FIG. 2 shows the "unbolted" position of the unbolting element 8. The drive unit 16, 17, 18, 19 which relevantly impinges the unbolting element 8 in the execution example ensures the transition from the bolted to the unbolted position.

As a consequence of this unbolting movement of the unbolting element 8, this means an anti-clockwise direction movement of the unbolting element 8 around its rotational axis A, a pin 15 of the unbolting element 8 becomes adjacent to an activation arm 2b of the pawl 2. Thus, the locking or latching pawl 2 is pivoted in a clockwise direction around its rotational axis 7. The clockwise direction movement of the latching pawl 2 in relation to its rotational axis 7 now ensures that the activation arm 2a of the locking pawl or latching pawl 2 is released from the contact surface 5 of the catch 1. To this end, the unbolting element 8 must overcome the latching moment M or the forces exerted by the spring 4 on the latching pawl 2. To complete the opening process, the catch 1 can pivot in a clockwise direction assisted by the spring and release the locking clip S. Now the pertaining backrest is unbolted.

Upon observation of the functional sequence in FIG. 2 during transition from the "bolted" position in the left part of FIG. 2 to the "unbolted" position in the right part a pinion element 19 moves as a component of the drive unit 16, 17, 18 from a left end stop 20 to a right end stop 21. This is shown in the middle image in FIG. 2. In the right image in FIG. 2 the unbolting element 8 is still in its "unbolted" position, whereas the drive unit 16, 17, 18 has reverted to its "bolted" position.

The drive unit 16, 17, 18, 19 comprises an electromotor 16 with a pinion shaft and a pinion wormgear 17 thereon. The pinion wormgear 17 combs with a gear shaft 18. The gear shaft 18 engages with an end-side cog into a pertaining cog of the pinion element 19. The pinion element 19 in the execution example is not restrictively a pinion disc which demonstrates a largely circular-shaped design. On the basis of the image in FIG. 2 it is recognized that the pinion element 19 and the unbolting element 8 are respectively pivotably located on the same axis in relation to the joint axis A.

The axis A for the pinion element 19 and the unbolting element 8 runs parallel to an axis of the gear shaft 18. The axis of the gear shaft 18 and consequently the gear shaft 18 is arranged above and at a distance from axis A for the pinion element 19 or the unbolting element 8. Thus, below the gear shaft 18 construction space is available which is filled in the execution example by the pinion wormgear 17 on the pinion shaft of the electromotor 6. Thus, the pinion wormgear 17 engages from below into the gear shaft 18, namely at one end. At the other end the gear shaft 18 combs with the cog of the pinion element or the pinion disc 19. Thus, relevant rotations of the electromotor 6 can be transferred to the pinion disc 19 in order to pivot these around their axis A. Consequently, the electromotor 16 together with its pinion shaft is arranged in its longitudinal extension predominantly parallel to the level spanned by the pinion disc 19. Furthermore, the gear shaft 18 ensures on the one hand force transmission from the pinion wormgear 17 to the gear shaft 18 and on the other hand from the gear shaft 18 to the cogging and consequently force transmission to the pinion disc 19. Thus, the gear shaft 18 is a double gear shaft 18.

In order to prevent any cantings within the portrayed drive train starting from the electromotor 6 via its pinion shaft and the pinion wormgear 17, the gear shaft 18 and finally to the pinion element or the pinion disc 19, the drive unit 16, 17, 18, 19 for the unbolting element 8 is equipped with the specially designed end stops 20, 21. In fact, the respective end stop 20, 21 possesses a cantilever arm 20a or a 21a formed end stop. The cantilever arm 20a or 21a is respectively connected to a base 20b, 21b. The base 20b, 21b and the cantilever arm 20a, 21a respectively define a single-component cantilever end stop 20a, 20b; 21a, 21b. The relevant cantilever end stop 20a, 20b; 21a, 21b is made of plastic in the execution example.

Dependent on the selection of the relevant plastic and the length of the cantilever arm 20a, 21a the elasticity and also deformation of the cantilever end stop 20a, 20b; 21a, 21b defined as such can be varied. Both end stops 20, 21 correspond on the one hand to the "bolted" position and on the other hand to the "unbolted" position of the relevant latching device or the pertaining locking mechanism 1, 2, 3. In fact, the left end stop 20 belongs to the "bolted" position of the latching device, while the right end stop 21 belongs to the "unbolted" position of the latching device.

It is recognized that the pinion element or the circular-shaped pinion disc 19 interacts with the cantilever arm 20a, 21a. To this end, the pinion element 19 runs aground on attainment of the respective end stop 20, 21 with an edge 22 on the relevant and cantilever arm 20a, 21a. This is fundamentally attributable to the relevant edge 22 being arranged radially compared to the axis A. Furthermore, the relevant stop 20, 21 is mainly located in a radial direction compared to this axis A or is mainly orientated radially compared to the axis A. Thus, the pinion element 19 impinges the cantilever arm 20a, 21a of the relevant end stop 20, 21 with a force running predominantly vertical to the longitudinal extension of the relevant arm 20a, 21a. As a consequence hereof, the relevant cantilever arm 20a, 21a is elastically deformed.

At the same time, the drive unit 16, 17, 18, 19 is gently decelerated by the elastic deformation of the cantilever arm 20a, 21a. Thus, no cantings occur in the depicted drive train because the individual coggings can be orientated against one another and not tensioned. As a consequence hereof, functional safety is increased, with simultaneously especially compact construction of the drive unit 16, 17, 18, 19.

The invention claimed is:

1. A latching device for bolting and unbolting seat backrests in motor vehicles; the latching device comprising:
   a housing;
   a locking mechanism that is mounted to the housing and has a catch, at least one pawl, and an unbolting element;
   a drive unit that mechanically impinges the unbolting element of the locking mechanism; and
   at least one end stop engageable and disengageable by the unbolting element, wherein the at least one end stop includes a base that is fixed to the housing in a stationary position and a cantilever arm that is elastically deformable relative to the base when the cantilever arm is engaged by the unbolting element.

2. The latching device in accordance with claim 1, wherein the at least one end stop is formed by the base and the cantilever arm defining a single-component cantilever end stop.

3. The latching device in accordance with claim 2, wherein the cantilever end stop is made of plastic and/or metal.

4. The latching device in accordance with claim 1, wherein the at least one end stop of the drive unit includes two end stops.

5. The latching device in accordance with claim 4, wherein each of the two end stops has the base that is fixed to the housing in a stationary position.

6. The latching device in accordance with claim 4, wherein one of the two end stops corresponds to a bolted position of the latching device and the other of the two end stops corresponds to an unbolted position of the latching device.

7. The latching device in accordance with claim 6, wherein after both the drive unit and the unbolting element move to positions corresponding to the unbolted position of the latching device, the drive unit is configured to return to a position corresponding to the bolted position of the latching device when the unbolting element remains in a position corresponding to the unbolted position.

8. The latching device in accordance with claim 1, wherein the drive unit includes at least one electromotor, a gear shaft and a pinion element.

9. The latching device in accordance with claim 8, wherein the pinion element interacts with the cantilever arm.

10. The latching device in accordance with claim 8, wherein the pinion element engages the at last one end stop with an edge to or on the cantilever arm.

11. The latching device in accordance with claim 8, wherein the pinion element impinges the cantilever arm with a force running vertically to a longitudinal extension of the cantilever arm.

12. The latching device in accordance with claim 8, wherein the pinion element is directly engageable with the cantilever arm.

13. The latching device in accordance with claim 1, wherein the cantilever arm is formed of an elastic material.

14. The latching device in accordance with claim 1, wherein the drive unit includes a pinion and the cantilever arm is impingeable by both the pinion and the unbolting element.

15. The latching device in accordance with claim 14, wherein the pinion element is arch-shaped.

16. The latching device in accordance with claim 15 further comprising an additional end stop, wherein first opposing edge of the pinion element is engageable with the at least one end stop and a second opposing edge of the pinion element is engageable with the additional end stop.

* * * * *